Dec. 21, 1937.   J. V. McMAHON   2,103,011
TIRE DEFLATION SIGNAL
Filed May 16, 1936
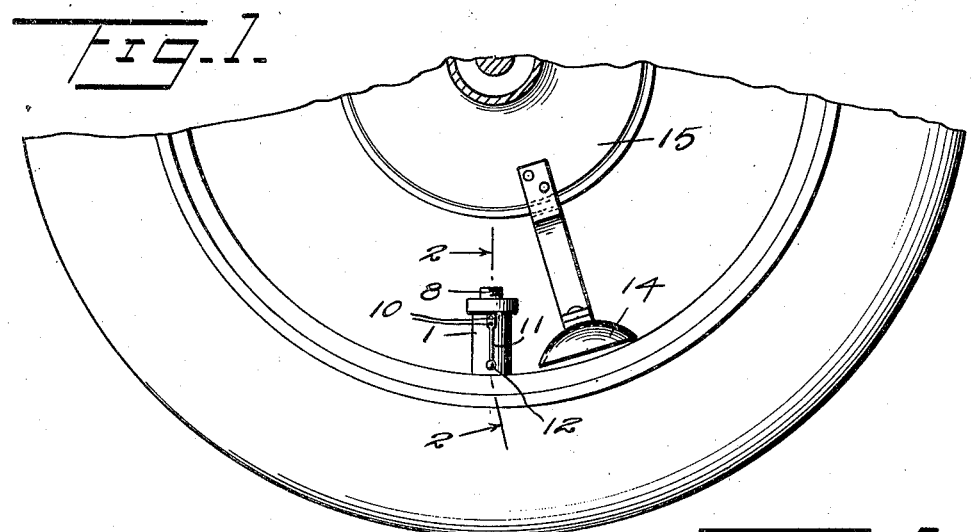
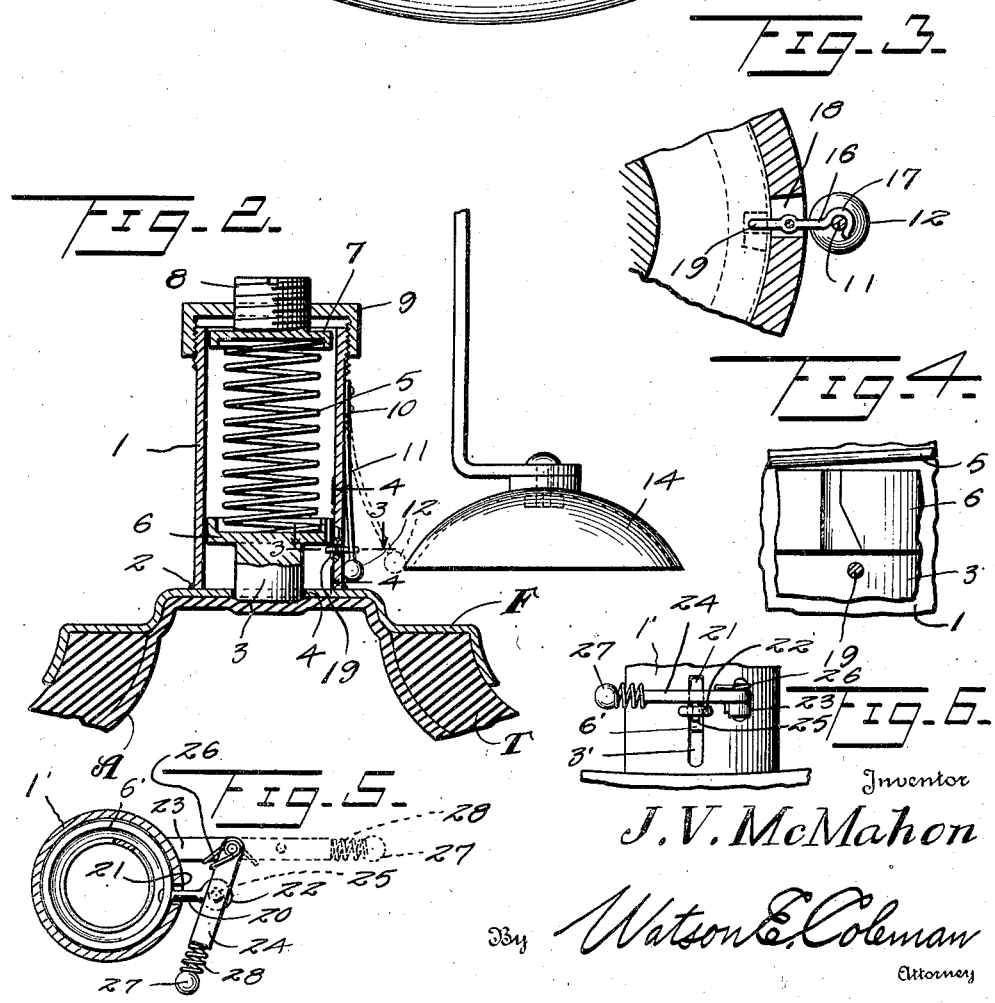
Inventor
J. V. McMahon
By Watson E. Coleman
Attorney Patented Dec. 21, 1937

2,103,011

UNITED STATES PATENT OFFICE 2,103,011

TIRE DEFLATION SIGNAL

John V. McMahon, Ness City, Kans.

Application May 16, 1936, Serial No. 80,199

2 Claims. (Cl. 116—34)

This invention relates to a tire deflation signal, and it is primarily an object of the invention to provide a device of this kind of a percussion type and which becomes effective upon undue deflation of the air pressure within a tire.

It is also an object of the invention to provide a signal of this kind wherein a bell or other resonant element is supported adjacent to the rim or felly of a wheel and wherein a hammer is carried by said rim or felly for striking the bell or kindred element as the wheel rotates, together with means for normally maintaining the hammer in an ineffective position.

The invention consists in the details of construction and in the combination and arrangement of the several parts of my improved tire deflation signal whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a view in elevation illustrating a deflation signal constructed in accordance with an embodiment of my invention and in applied position, the associated wheel being in fragment;

Figure 2 is an enlarged transverse detailed sectional view taken substantially on the line 2—2 of Figure 1;

Figure 3 is an enlarged detailed sectional view taken substantially on the line 3—3 of Figure 2;

Figure 4 is a detailed sectional view taken substantially on the line 4—4 of Figure 2;

Figure 5 is a view partly in section and partly in top plan illustrating another embodiment of my invention;

Figure 6 is a fragmentary elevational view of the structure illustrated in Figure 5.

As disclosed in the accompanying drawing, 1 denotes a stem or casing welded, as at 2, or otherwise secured to the felly or rim F of a wheel structure. Working in this stem or casing 2 is a plunger 3 which freely passes through a suitably positioned opening 4 in the felly F whereby the outer end of the plunger 3 has close contact with the inner tube A within the tire T mounted upon the felly or rim F. The air pressure within the tube A normally maintains the plunger 3 in a retracted position within the stem or casing 1 and against the tension of a spring 5.

This spring 5 is interposed between the head 6 carried by the inner or inserted end of the plunger 3 and a plate 7 freely arranged within the outer end portion of the stem or casing 1. This plate 7 has direct contact with a regulating plug or screw 8 threaded through a cap 9 closing the outer end of the stem or casing 1. This cap 9 may be threaded or otherwise engaged with the stem or casing.

Secured, as at 10, to the casing 1 and exteriorly thereof is an elongated spring hammer arm 11, the inherent resiliency of which normally causing the same to swing out away from the stem or casing 1 as indicated by broken lines in Figure 2. The outer or free end portion of the hammer arm 11 carries a head 12 and when the arm 11 is in its outer normal position as indicated by broken lines, the head 12 will forcibly come into contact with a bell 14 suitably supported upon a brake drum 15 or an axle housing.

Normally, however, the arm 11 as illustrated in Figure 2 is held close to the casing or stem 1 by a swinging latch 16, one end portion of which as herein disclosed has a hook 17 engaging over the hammer arm 11. This latch 16 is shown as being pivotally supported within an opening 18 provided in the wall of the casing or stem 1 at a point relatively close to the felly or rim F. This swinging latch 16 has a tail piece 19 which extends within the casing or stem 1 for contact by the head 6 of the plunger 3 as the plunger 3 is forced outwardly by the spring 5 as permitted by the deflation of the air pressure within the tube A. This contact of the head 6 with the tail piece 19 will free the hook 17 from the arm 11 whereupon said arm 11 will swing outwardly into a position to bring the head 12 in position to have contact with the bell 14 as the felly or rim F rotates and thus giving audible signal to the driver or other occupant of the vehicle that a tire needs attention.

In the embodiment of the invention as illustrated in Figures 5 and 6, a plunger 3' or more particularly the head 6' thereof carries an outwardly and radially disposed rigid shank 20 which is directed through an elongated slot 21 provided in a wall of the stem or casing 1'. This slot 21 extends in the same general direction as the travel of the plunger 3' and the outer portion of the shank 20 is provided with an eye 22. Extending outwardly from the casing or shell 1' is an arm 23 and pivotally connected to the outer portion of the arm 23 is an end portion of a lever 24. This lever 24 at a desired point intermediate its ends carries a depending pin 25 which passes through the eye 22 when the plunger 3' is in its normally retracted position as determined by the air pressure of the tire with which the device is employed.

The pivoted portion of the arm 23 and the lever 24 have operatively engaged therewith in a conventional manner a spring 26 which, when the pin 25 is disengaged from the eye 22, throws the lever 24 outwardly as indicated by broken lines in Figure 2 so that the head 27 carried by the outer portion of the lever 24 will be in a position to strike a bell or kindred alarm as the wheel rotates. In this present embodiment of my invention the head 27 is flexibly and resiliently secured to the outer end portion of the lever 24 by a spiral spring 28.

As the pressure within the tire decreases the plunger 3' will move outwardly of its casing or shell 1' and when such movement has been sufficient to free the eye 22 from the pin 25, the lever 24 under the action of the spring 26 will be thrown outwardly in desired striking position.

From the foregoing description it is thought to be obvious that a tire deflation signal constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In combination with a wheel having a pneumatic tire thereon and an adjacent stationary portion of a vehicle body, a percussion signal carried by said stationary portion of the vehicle body, a casing carried by the wheel, a spring-pressed plunger working in the casing, said plunger being maintained inwardly of the casing by the pressure within the tire and moving outwardly of the casing as such pressure decreases, an arm pivotally carried by the casing, means for normally swinging the arm outwardly into a position to strike the signal as the wheel rotates, a shank movable with the plunger and having an eye, and a pin carried by the swinging arm, said pin being passed through the eye when the lever is swung into an inoperative position with respect to the signal, said pin and shank disengaging when the plunger has moved a predetermined distance outwardly of the casing.

2. In combination with a wheel having a pneumatic tire thereon and an adjacent stationary portion of a vehicle body, a percussion signal carried by said stationary portion of the vehicle body, a casing carried by the felly of the wheel, said felly having an opening communicating with said casing, a spring pressed plunger slidable in said casing and having a portion engageable through said opening for contact with an inner tube, a hammer swingably carried by said casing, and releasable holding means engageable with said hammer and projecting into said casing for contact with said plunger to hold said hammer in inoperative position, the inner tube when inflated holding said plunger in retracted position, deflation of said inner tube releasing said plunger for movement outwardly through said opening, outward movement of said plunger releasing said holding means.

JOHN V. McMAHON.